April 13, 1954    L. LANNEFORS    2,674,878
MEANS FOR MEASURING AND REGISTERING WIND POWER
Filed May 11, 1950    2 Sheets-Sheet 1
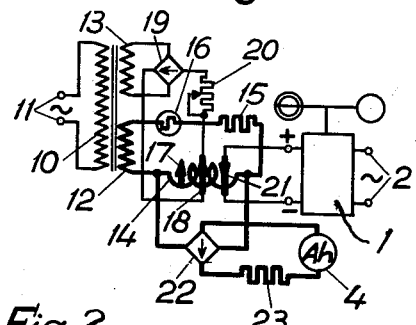
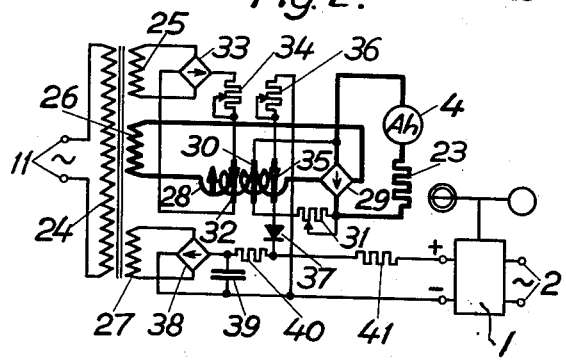
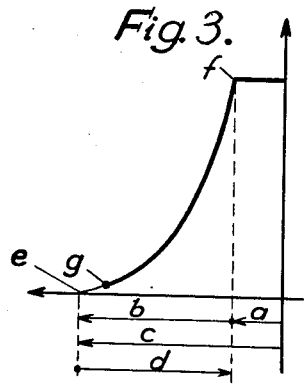
Inventor
Lennart Lannefors
By
Attorney.

Inventor
Lennart Lannefors
By
Attorney.

Patented Apr. 13, 1954

2,674,878

UNITED STATES PATENT OFFICE 2,674,878

MEANS FOR MEASURING AND REGISTERING WIND POWER

Lennart Lannefors, Ludvika, Sweden, assignor to Allmanna Svenska Elektriska Aktiebolaget, Vasteras, Sweden, a Swedish corporation Application May 11, 1950, Serial No. 161,309

Claims priority, application Great Britain May 24, 1949

7 Claims. (Cl. 73—170)

This invention relates to electrical means for measuring and registering wind power.

The use of wind energy has recently become of particular interest, and in order to ascertain whether a particular site is suitable for the erection of a wind power station, or to compare the relative suitabilities of various sites for such a purpose, devices for the measurement of wind power are in the first place required. By means of these devices it is possible to obtain the necessary statistical evidence upon which the choice of site can be based. The measuring device, which ought to include an integrating meter, should be made in such a way as to permit simple handling and ease of transport from one measuring point to another. Moreover the device may be combined with a duration meter, e. g. an instrument showing the duration in hours of wind power within different ranges.

Usually the wind-gauge consists of a wind operated vane system, which is caused to rotate, and which, by means of a suitable member, may either generate a certain direct current voltage, corresponding to the wind speed, or may convert a given voltage into a direct current voltage, varying with the wind speed.

In measuring wind energy, the device should pay regard to the known fact that the wind power varies as the cube, or third power, of the wind speed. In order to simplify comparison, it is suitable that the device records the cube of the wind speed.

It is desirable that the measuring device fulfills the conditions that it shall not record wind speeds of less than a predetermined minimum value, and also that it should record a constant value when the wind speed exceeds a predetermined maximum value. By fulfilling these requirements, the measuring device will respond to a range of wind powers which, as far as possible, agrees with the working range of a modern wind-driven generator.

According to this invention, a rotating member is arranged to deliver or to generate a direct current voltage or current, varying with the wind speed, which voltage or current is arranged to influence an integrating meter, in the circuit of which an impedance element is arranged, the traversing current of which varies according to the same function as that according to which the wind power varies.

A device according to the present invention fulfills all the requirements mentioned and thus forms a particularly suitable means for analysing wind energy at a site during long or short periods of time.

The invention will be further described with reference to the accompanying two drawings, in which Figure 1 schematically shows an arrangement according to the invention using a pre-saturated reactor, in the following called a transductor, the voltage of which feeds the integrating meter. According to one definition, the transductor device consists of one or more ferro-magnetic cores with windings by means of which an alternating current voltage or current can be varied by a voltage or current utilizing saturation phenomena on the core material.

Figure 2 shows a complete diagram of a form according to the invention.

Figure 3 shows the cubical wind power wind speed curve represented by a diagram of the current through a transductor as a function of the excitation current.

In all figures corresponding items are designated by the same reference numerals.

Figure 4:
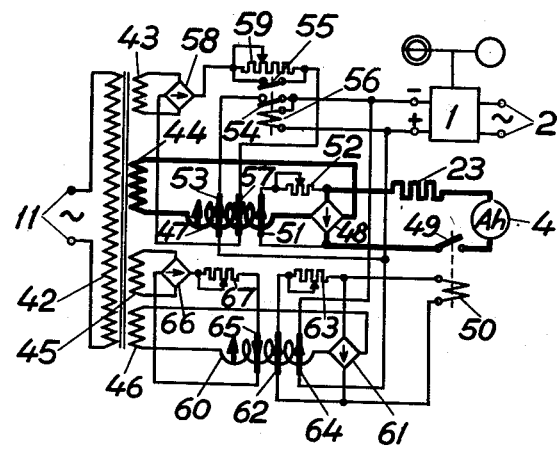
Figure 4 shows another diagram of a form according to the invention.

In all figures the reference numeral 1 is used for the wind-gauge converting the wind speed into a direct current voltage. A suitable form of the wind-gauge is described in the "ASEA Journal 1948" March-April, pages 39–42, especially Fig. 6 (page 41), copies of which journal may be seen at the National Bureau of Standards, Washington, D. C., and at the Engineering Society Library, 22 West 39th Street, New York, New York, and elsewhere in U. S. A., and which wind-gauge consists of a member connected to an existing electrical network at 2, containing the above-mentioned vane system, which during its rotation alternatively short-circuits a number of condensers which have been previously charged by a constant direct current voltage derived from the network 2 which may supply alternating or direct current voltage. When short-circuited, the condensers are discharged, and a direct current voltage may thus be obtained from the device through suitably arranged conductors. This voltage will be proportional to the frequency of the movements of the short-circuiting contacts, operated by the vanes. A device of that kind is extremely sensitive, and has very small losses, and thus reproduces the wind speed in an accurate way. It must be pointed out, however, that the invention, of course, does not exclude the use of other members for the same purpose, such as generators and the like.

Figure 1 shows diagrammatically a simplified arrangement according to the invention, using a transductor as the non-linear impedance element. In this form, no regard is paid to the limitation of the operating range which may be accomplished in any way, some of which are shown in the other forms. In this figure, the direct current voltage delivered from the wind-gauge 1 is impressed upon an excitation winding of a transductor, the alternating current, or in this case voltage, of which is supplied to the instrument. The transformer 10, the primary terminals 11 of which are connected to an alternating current line, has two secondary windings 12 and 13. The winding 12 is connected to the alternating current winding of a transductor 14, the transductor being drawn according to a conventional symbol. In series with the transductor a resistor 15 and an iron filament lamp 16 are inserted. The transductor symbol shows self-excitation (compare the Patent 2,455,869), preferably arranged as spare-self-excitation (compare the Patent 2,470,556) in order to increase the sensitivity, indicated by the arrow 17, which arrow also indicates the necessary direction of the current in the other excitation windings to give an increase of the output from the transductor. The transductor is provided with a certain pre-excitation by the winding 18, the current of which is supplied by the winding 13 of the transformer 10 through a rectifier 19. A resistor 20 is inserted in series with the winding 18 as a means of adjusting the current in said winding. The current of the winding 18 co-operates with the self-excitation. The wind-gauge 1 is supplying a voltage to an opposing excitation winding 21. The voltage across the transductor is after rectifying in the rectifier 22 delivered to the ampere-hour meter 4 in series with which a resistor 23 is connected.

By the pre-excitation, the transductor is made to operate at the lower bend of its characteristic curve at small wind speeds. With increasing wind speeds, the transductor operates at points according to the ascending characteristic curve, giving a voltage across the transductor which thus substantially follows the wind power. The iron filament lamp 16 serves as a current stabilizer in the transductor circuit. The lower limit may be obtained by fitting the ampere-hour meter with known means for magnetic blocking which releases the rotating member of the instrument when a certain current passes through it.

In Figure 2, 24 is the primary winding of a transformer, connected to an alternating current line at 11. The transformer is provided with three secondary windings 25, 26, 27. To the winding 26 a circuit is connected containing in series a transductor 28 and a rectifier 29. The latter supplies direct current for the integrating meter, consisting of an ampere-hour meter 4, connected in series with a resistor 23. The rectifier also provides self-excitation by means of the control winding 30 of the transductor connected to it. The transductor may, as described above, profitably be fitted with means for spare-self-excitation indicated by the arrow. The winding 30 is co-operating with that spare-self-excitation. The current through the winding 30 may be adjusted by the resistor 31. The excitation winding 32 of the transductor which opposes the before-mentioned windings is fed from the secondary winding 25 over the rectifier 33 and the adjustable resistor 34. A further winding, co-operating with the winding 32, is denoted by 35. This winding is in series with a resistor 36 and a current valve 37 traversed by a current forming the difference between a constant comparison current obtained from transformer winding 27, rectified by the rectifier 38, and smoothed by the condenser 39, and the current from the wind-gauge 1. To adjust the currents in the circuits two resistors 40 and 41 are inserted.

The last mentioned arrangement of the excitation winding 35 allows the ampere-hour meter 4 to register as at constant wind speed for wind speeds above the upper limit of the range. The valve element is so connected as to block the excitation circuit 35 when the current from the wind-gauge 1 exceeds the constant comparison current. When the excitation winding 35 is blocked, the magnetisation of the transductor is only determined by the constant current through the winding 32. If the wind speed falls below that upper limit, the current through the winding 35 will vary linearly to its maximum value which is attained at a wind speed equal to zero. The current through the windings 35 will then bring down the magnetisation of the transductor to its minimum value, and the load current will be diminished according to the shape of the characteristic curve.

In order to make the transductor operate within the desired part of its characteristic curve, it may be provided, as mentioned above, by one or several magnetising windings. The shape of the transductor curve may be influenced, e. g. by altering the degree or mode of smoothing of the excitation current, by varying the alternating current voltage in the transductor circuit or by varying the degree of self-excitation. The lower bend of the characteristic curve may be altered by these means in a desired manner, as well as the steepness of the ascending part of the curve.

In Figure 3, the function between the excitation current (the abscissa) and the load current traversing the transductor (the ordinate) is illustrated. The arrow $a$ indicates the constant pre-excitation through the winding 32 (Figure 2), and $b$ represents the current through the winding 35, at full length of the arrow $b$, depending only on the constant comparison current from the rectifier 38. The load current varies from the point $e$ at the lowest wind speed, i. e. no current from the wind-gauge 1, to the point $f$ at full wind speed, i. e. full current from the wind-gauge.

By using a form of the invention according to Figure 2, some difficulties will arise to obtain a discontinuous change at $f$ from the transductor curve to the horizontal line. If a more definite following of the ideal curve is desired, the device may be constructed, for instance, according to the scheme in Figure 4.

In Figure 4, the primary winding 42 of a transformer is connected to the line at 11. The transformer is provided with four secondary windings 43–46. To the winding 44 is connected in series a transductor 47 and a rectifier 48. The latter feeds the instrument 4 in series with the resistor 23. In that circuit a contact 49 of a relay 50 is inserted by means of which the above mentioned lower limit of the operating range is controlled, as will be described hereinafter. The rectifer 48 also feeds a self-excitation winding 51 of the transductor in series with a resistor 52. The transductor is provided with an additional winding 53 co-operating with the winding 51 and connected to the terminals of the wind-gauge in series with a contact 54 of a voltage responsive relay 56. The relay coil is also connected to the wind-gauge. Another excitation winding 57, opposing the other, is connected to the transformer winding 43 over the rectifier 58. Normally a resistor 59 in that excitation circuit is short-circuited by the contact 55 of the same relay 56.

The lower limit relay 50 is fed through a transductor amplifier 60. The transductor is connected to the transformer winding 46 in series with the rectifier 61 from which the rectified load current is supplied to the relay coil 50. To obtain highest sensitivity, the transductor is spare-self-excited and provided with an additional self-excitation by means of the winding 62, connected to the rectifier 61 in series with the resistor 63. A co-operating excitation is obtained by the winding 64 connected to the terminals of the wind-gauge. An opposing excitation is provided by the winding 65 fed from the rectifier 66 in series with the resistor 67. That rectifier is connected to the transformer winding 45.

By means of the transductor amplifier 60, the small current supplied from the wind-gauge especially at weak winds is amplified, and at a certain wind speed the relay 50 is caused to close its contact 49. At wind speeds within the operating range of the instrument 4, the transductor 47 supplies a current to it which follows the desired cubical curve. The effect of the excitation windings is shown in Figure 3. The arrow c indicates the constant pre-excitation by the winding 57 in case that the resistor 59 is short-circuited. The opposing excitation represented by the arrow d is obtained by the winding 53 from the voltage varying with the wind speed. At g, the relay 50 closes its contact 49, and at f, the upper limit is reached and it is then desired that the instrument should record a constant value for exceeding wind speed. This is achieved by the voltage responsive relay 56 which, at a certain wind force, at f, breaks the excitation circuit containing the winding 53, and breaks the short-circuiting of the resistor 59 which causes the excitation through the winding 57 to be diminished from the value c to a value corresponding to the arrow a. This value is independent of wind speeds above the upper limit, but at lower wind speed the relay 56 will close the contacts 54, 55 and the instrument will record again according to the transductor curve.

Figure 5:
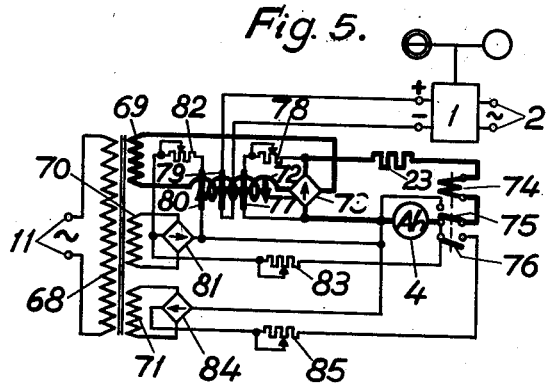
Figure 5 shows a further diagram of a form according to the invention.

The last form, shown in Figure 5, shows a modification as to the arrangement of the relay for the upper limit. In the figure, the transformer 68 is fed by the line at 11 and is provided with three secondary windings 69, 70, 71. To the winding 69 are connected in series the transductor 72 and the rectifier 73 which feeds two circuits, one containing in series the instrument 4, a contact 75 of a relay 74, the coil of said relay 74 and a resistor 23, and the other the self-excitation winding 77 of the transductor in series with the resistor 78. By the same reasons as mentioned before, the transductor is preferably space-self-excited. The voltage varying with the wind speed is directly supplied to the cooperating excitation winding 79 from the wind-gauge 1 which in its turn is connected to the line at 2. A pre-excitation is obtained by the winding 80, opposing the self-excitation windings and connected to the rectifier 81 in series with the resistor 82. The rectifier is connected to the transformer winding 70. The same rectifier is also used for a special purpose which may be explained in the simplest way as a displacement of the axis of abscissae in order to allow the registering of weak wind forces. For this purpose the rectifier is connected through the adjustable resistor 83 to the instrument in such a way that the current from this rectifier opposes the current from the transductor.

The upper limit of the operating range is controlled by the current responsive relay 74 which at a certain wind speed operates its contacts, and by means of the contact 75, disconnects and bridges the instrument 4, and by means of the contact 76 at the same time connects the instrument to the constant voltage source represented by the rectifier 84 which is connected to the transformer winding 71. For adjusting the current, a resistor 85 is inserted. In this way the instrument will procure a constant recording for wind forces above the upper limit.

According to this form of the invention the lower limit may conveniently be controlled by a blocking device at the instrument.

I claim as my invention:

1. A device for measuring and registering wind power, comprising a rotating wind driven vane system, a direct current generator coupled to said system, a transductor, an alternating current source feeding said transductor, a control winding for said transductor, means connecting said control winding with said generator, an integrating meter connected with the transductor, said transductor being so dimensioned and constructed as to change its traversing current in function of the current through said control winding according to the same function as the wind power varies with the wind speed.

2. A device according to claim 1, comprising means whereby the said transductor is self-excited.

3. A device according to claim 1 in which the said integrating meter is connected in parallel with said transductor.

4. A device according to claim 1, comprising means for blocking the said meter until there passes therethrough a predetermined current corresponding to a wind speed above a certain limit, and means for disconnecting the meter from the transductor when a current has been reached corresponding to an upper wind speed limit and for connecting it to a source of constant current.

5. A device for measuring and registering wind power, comprising a rotating wind driven vane system, a direct current generator coupled with said system, a transductor, an alternating current source feeding said transductor, an integrating meter supplied by the current through the transductor, said transductor being adapted to change its traversing current in function of the current through said control winding according to the same function as the wind power varies with the wind speed, a source for delivering a constant current, said source being connected in series with said generator, a control winding for said transductor being connected across the terminals of said generator, and a valve inserted in series with said control winding, said valve being adapted to block when the current from said generator has a tendency to exceed the current from said constant current source.

6. A device for measuring and registering wind power, comprising a rotating wind driven vane system, a direct current generator coupled to said system, a transductor, an alternating current source feeding said transductor, an integrating meter supplied by the current through said transductor, a control winding for said transductor being connected to said generator, means for limiting the current through said transductor when the wind speed exceeds a predetermined value, comprising another control winding on said transductor, a current source for feeding the last mentioned control winding, a resistor connected in series with the last mentioned control winding, a voltage relay connected to said generator, two contacts operated by said relay, one of said contacts being arranged to disconnect the first mentioned control winding at a voltage corresponding to said predetermined wind speed, and the other contact being arranged to break a short-circuit of said resistor at the same time, the transductor being so dimensioned and constructed as to change its traversing current in function of the current through said control winding according to the same function as the wind power varies with the wind speed.

7. A device for measuring and registering wind power, comprising a rotating wind driven vane system, a direct current generator coupled to said system, a transductor, an alternating current source feeding said transductor, a control winding of said transductor being connected to said generator, an integrating meter connected to said transductor, a constant current source, and a current relay inserted in series with the integrating meter, the said relay being provided with two contacts, one of which is arranged to disconnect said integrating meter at a current corresponding to a predetermined wind speed and to bridge said integrating meter, and the other contact being arranged to connect said instrument to said constant current source.

References Cited in the file of this patent

UNITED STATES PATENTS

| Number | Name | Date |
|---|---|---|
| 1,687,575 | Lubowsky | Oct. 16, 1928 |